Patented Aug. 21, 1923.

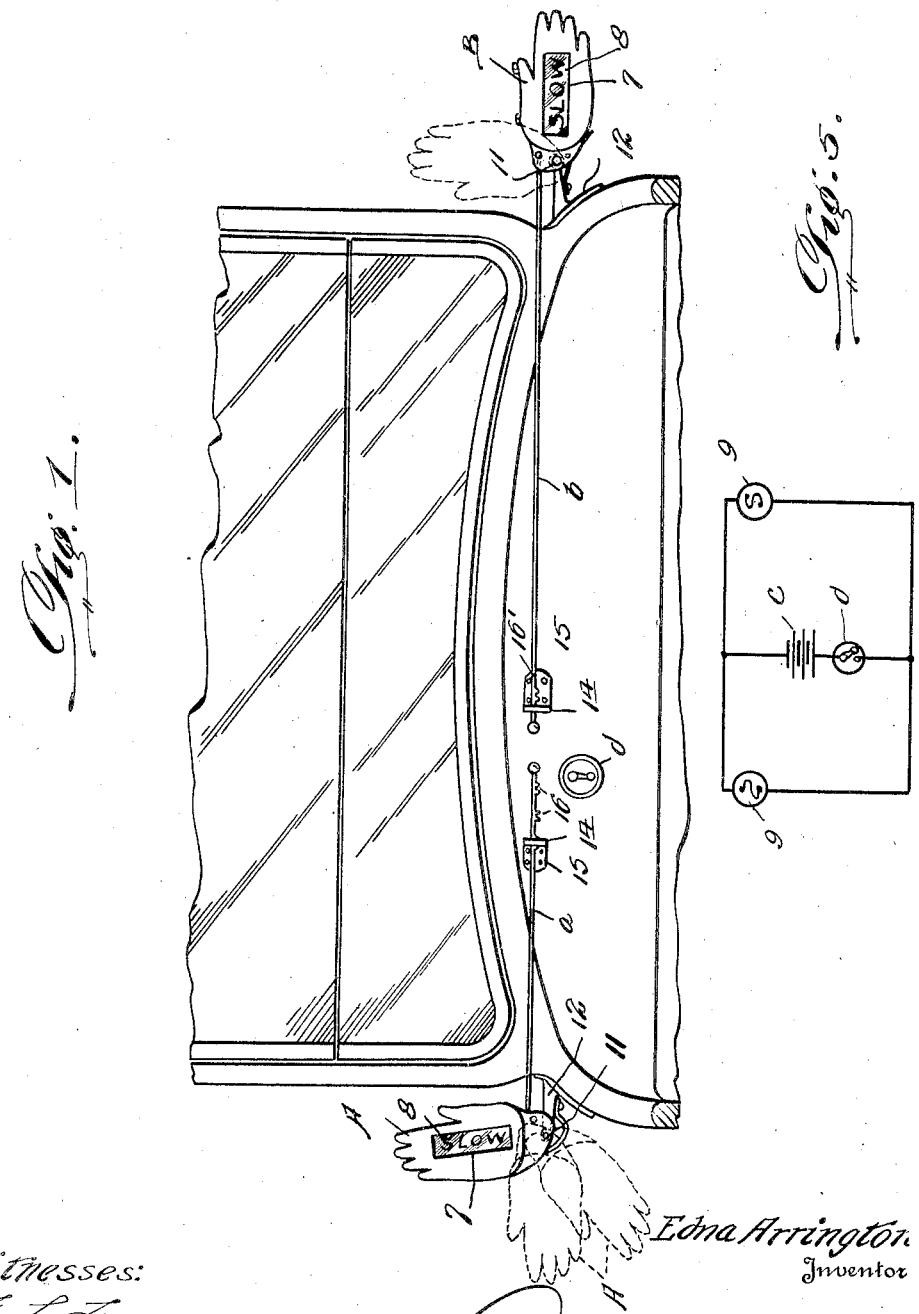

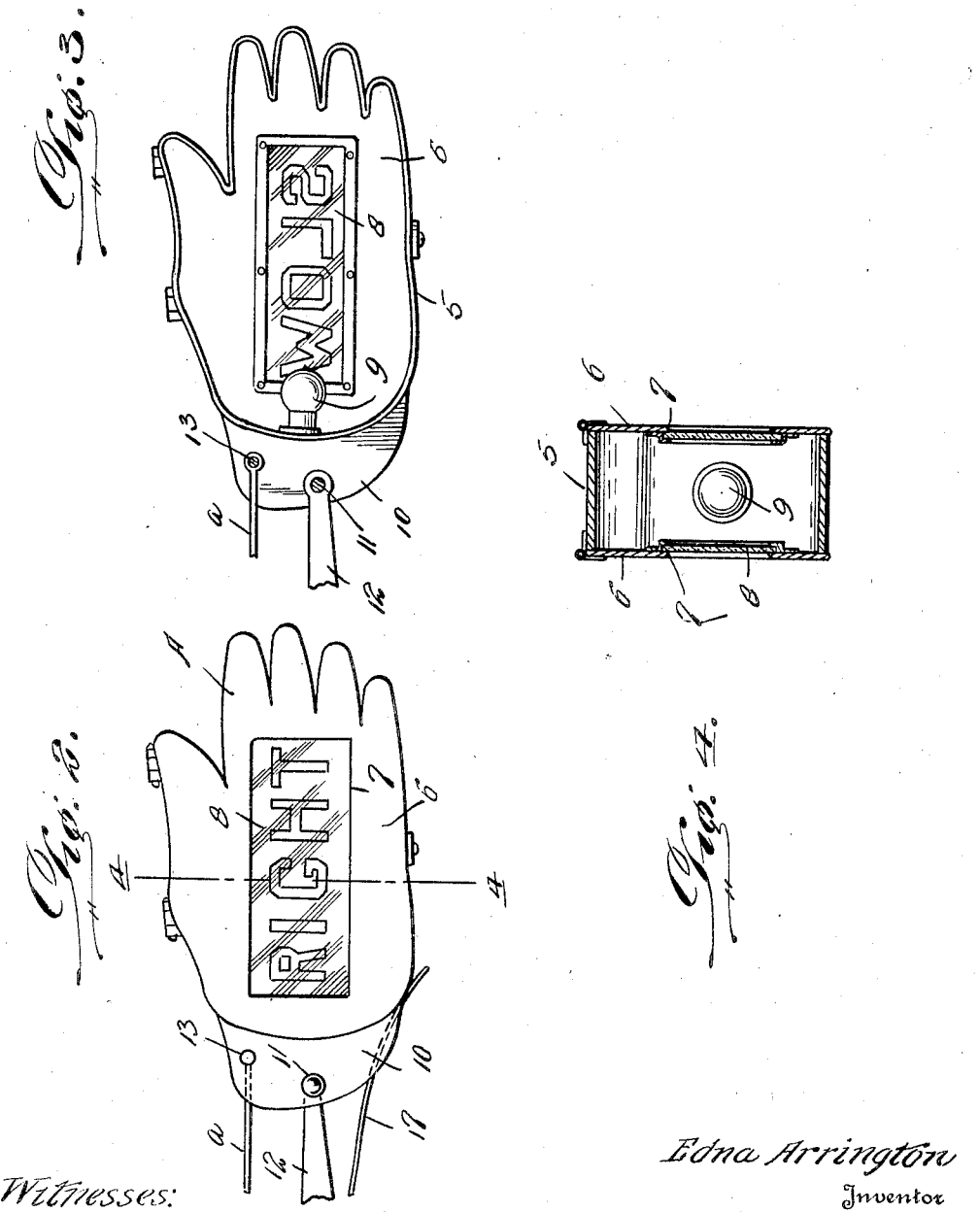

1,465,405

UNITED STATES PATENT OFFICE.

EDNA ARRINGTON, OF STAR, OREGON.

VEHICLE SIGNAL.

Application filed February 6, 1923. Serial No. 617,223.

*To all whom it may concern:*

Be it known that I, EDNA ARRINGTON, a citizen of the United States, residing at Star, in the county of Lane and State of Oregon, have invented certain new and useful Improvements in Vehicle Signals, of which the following is a specification.

My invention relates to improvements in signals primarily adapted for application to motor vehicles for indicating to the drivers of approaching vehicles or to traffic officers, the intention of the operator of the vehicle to make a right or left hand turn or to bring his machine to a stop.

A further object of my invention resides in the provision of such a signal for vehicles, wherein the same is comparatively simple of construction, and of such a nature as to be readily installed upon any and all types of motor vehicles now upon the market.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a fragmentary sectional view through a motor vehicle, showing my improved signal disposed thereon, and at opposite sides of the vehicle windshield, and forwardly of the driver's seat of the vehicle.

Figure 2 is an elevational view of one of the swinging signal boxes employed in conjunction with my invention.

Figure 3 is a longitudinal cross sectional view thereof.

Figure 4 is a vertical transverse sectional view upon the line 4—4 of Figure 2, and Figure 5 is a diagrammatic view of the wiring circuit.

With particular reference to the drawings, my device includes the provision of a pair of signal boxes A and B pivotally supported upon the left and right side respectively of a motor vehicle, and preferably at a position thereon as shown in Figure 1.

Each of these boxes are of identical construction, and a description of one will suffice for both. Per se, each of the boxes include a hollow casing 5 of the configuration of a hand, and being provided at its front and rear sides with hinged cover plates 6. Each of these cover plates are formed with a central longitudinal opening 7 therein, rearwardly of which there is supported glass plates 8, the front plate of the box A having the word "Left" formed therein and a similar plate of the box B being formed with the word "Right." The rear plates of each of the boxes are formed with the word "Slow" and disposed within each of the boxes is an incandescent bulb 9. The ends of the boxes adjacent the body of the vehicle are formed with a reduced extension 10, these extensions being pivotally secured as at 11 to brackets 12 carried by the body of the vehicle.

Operating rods *a* and *b* are pivotally secured at one end as at 13 to the respective boxes A and B. Each of these rods extend within the vehicle as more clearly shown in Figure 1, and engage within openings in rearwardly extending portions 14 of brackets 15 which may be and preferably are, secured to the instrument board of the motor vehicle. The inner end of the operating rod *a* for the signal box A is formed with three spaced pendent projections 16, the same being provided with notches for engagement with one edge of the said opening in the inwardly extending portion 14 of its respective bracket 15 for the purpose of retaining the said signal box in any one of its three positions as shown by the full and dotted lines of Figure 1.

The inner end of the operating rod *b* of its respective signal box B is formed with two similar pendent projections 16' for cooperating with the opening in the inwardly projecting portion 14 of its respective bracket 15 for maintaining the box B in the two set positions as shown by the full and dotted lines in the said Figure 1. The normal position of each of the boxes is vertical, and when either one of the same are moved to a horizontal position, it will indicate that the driver of the vehicle intends to make either a right or left hand turn. When the left hand box A is moved to an extreme downward position, it will indicate that the driver intends to slow down a machine or bring the same to a stop.

Counter-balancing springs 17 are rigidly secured at their inner ends to the before mentioned supporting brackets 12, the outer ends of these springs having close sliding contact with the adjacent portion of the respective signal boxes A and B, these springs effectively assisting in the upward swinging movement thereof.

The bulbs 9 within each of the signal boxes are electrically connected to a source of energy $c$ which may be, and preferably is the usual storage battery of the motor vehicle. The circuit between the battery and the bulbs 9 is made and broken through the instrumentality of a desirable form of switch $d$ which may be and preferably is mounted upon the instrument board of the vehicle.

In view of the above description, it is believed by me that the advantages and operation of my improved signal will be readily appreciated by those skilled in the art, and although I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters-Patent is:—

In a signal for motor vehicles, a pair of signal boxes pivotally disposed upon opposite sides of the motor vehicle and adjacent the front end thereof, each of said signal boxes including a casing having a reduced portion at the inner end thereof, brackets carried by the vehicle, pivotal connections between said reduced portions and said brackets, means for swinging said boxes upon their pivots, and counter-balancing springs fixed to the brackets and engaging said boxes for assisting in the upward pivotal movement of said boxes.

In testimony whereof I affix my signature.

EDNA ARRINGTON.